United States Patent
Bonin et al.

(10) Patent No.: US 6,751,047 B2
(45) Date of Patent: Jun. 15, 2004

(54) STEPPED DISC DRIVE VOICE COIL ACTUATOR ACCELERATION FOR REDUCING RESONANCE OF HEAD LEVEL MICRO-ACTUATORS

(75) Inventors: Wayne Allen Bonin, North Oaks, MN (US); Joel David Limmer, Bloomington, MN (US); Zine Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 328 days.

(21) Appl. No.: 09/815,412

(22) Filed: Mar. 22, 2001

(65) Prior Publication Data

US 2001/0036036 A1 Nov. 1, 2001

Related U.S. Application Data

(60) Provisional application No. 60/191,822, filed on Mar. 24, 2000.

(51) Int. Cl.[7] ............................................. G11B 5/596
(52) U.S. Cl. ........................ 360/78.06; 360/78.05; 360/75; 360/78.12
(58) Field of Search .................. 360/75, 69, 78.09, 360/78.06, 78.05, 78.12; 318/560; 310/309, 82

(56) References Cited

U.S. PATENT DOCUMENTS

| | | | | |
|---|---|---|---|---|
| 4,916,635 A | | 4/1990 | Singer et al. | 364/513 |
| 5,638,267 A | | 6/1997 | Singhose et al. | 364/148 |
| 5,805,375 A | * | 9/1998 | Fan et al. | 360/78.12 |
| 6,034,834 A | * | 3/2000 | Yoshikawa et al. | 360/75 |
| 6,069,771 A | * | 5/2000 | Boutaghou et al. | 360/294.4 |
| 6,084,742 A | * | 7/2000 | Takaishi et al. | 360/78.06 |
| 6,088,187 A | * | 7/2000 | Takaishi | 360/78.05 |
| 6,160,676 A | * | 12/2000 | Takaishi | 360/78.05 |
| 6,493,172 B1 | * | 12/2002 | Morris et al. | 360/77.02 |
| 6,519,109 B1 | * | 2/2003 | Price et al. | 360/78.09 |

FOREIGN PATENT DOCUMENTS

EP     0975086 A1 *  1/2000   ........... G11B/21/02

\* cited by examiner

*Primary Examiner*—David Hudspeth
*Assistant Examiner*—K. Wong

(57) ABSTRACT

A disc drive having a voice coil actuator with an attached suspension and head, the head including a micro-actuator. The micro-actuator having at least one natural frequency and at least one natural frequency time period. The voice coil actuator is adapted to attenuate a resonance of the micro-actuator at the at least one natural frequency using a stepped acceleration.

19 Claims, 9 Drawing Sheets

STEPPED DISC DRIVE VOICE COIL ACTUATOR ACCELERATION FOR REDUCING RESONANCE OF HEAD LEVEL MICRO-ACTUATORS

RELATED APPLICATION

This application claims the benefit of U.S. Provisional Application Serial No. 60/191,822, filed Mar. 24, 2000 under 35 U.S.C. 119(e).

FIELD OF THE INVENTION

The present invention relates to the field of mass storage devices. More particularly, this invention relates to stepped disc drive voice coil actuator acceleration for reducing resonance or ringing of head level micro-actuators for a mass storage device.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, which is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring that produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

Increasing demand for data density makes higher track densities imperative. There is also demand for increased access speed, requiring very fast seek speeds. Some disc drives include micro-actuators to allow for fine track-to-track movements. The micro-actuator is an additional actuator located between the suspension and the slider of the head gimbal assembly (HGA) to provide minor positioning adjustments.

The micro-actuator may consist of a stationary part or "stator portion" attached to the suspension gimbal and a moving part or "rotor portion" that carries the read write head. The stator portion and rotor portion are connected with thin beams that act as springs, allowing enough movement to center the head on a very narrow track or switch between adjacent tracks.

However, high speed data access requires abrupt acceleration and de-acceleration of the micro-actuator. This sharp motion causes the rotor portion to resonate or vibrate at its natural frequency. This natural ringing can significantly impact the ability to obtain acceptable seek times since the micro-actuator does not settle or stop ringing at the end of a seek operation.

What is needed is a disc drive that reduces resonance of head level micro-actuators for a mass storage device.

SUMMARY OF THE INVENTION

The present invention provides stepped disc drive voice coil actuator acceleration for reducing ringing or resonance of head level micro-actuators for a mass storage device.

One embodiment includes a disc drive having a voice coil actuator with an attached suspension and head, the head including a micro-actuator. The micro-actuator having at least one natural frequency and at least one natural frequency time period. The voice coil actuator is adapted to attenuate a resonance of the micro-actuator at the at least one natural frequency using a stepped acceleration.

One embodiment includes a disc drive including a suspension attached to a voice coil actuator with a head attached to the suspension. The head includes a micro-actuator having a rotor portion and a stator portion with the stator portion attached to the suspension. The rotor portion is attached to the stator portion with the rotor portion having a resonance at a natural frequency with respect to the stator portion and having a natural frequency time period. The voice coil actuator is adapted to sweep the head into position by accelerating and decelerating the head in at least three steps.

One embodiment includes a method for damping a micro-actuator including providing a disc drive with a voice coil actuator and a micro-actuator, the micro-actuator having a natural frequency and a natural frequency time period, and applying a stepped acceleration to the micro-actuator with the voice coil actuator.

One embodiment includes an information system including a disc drive having a stepped disc drive voice coil actuator acceleration for reducing ringing of head level micro-actuators for a mass storage device.

The present invention provides stepped disc drive voice coil actuator acceleration for reducing ringing or resonance of head level micro-actuators for a mass storage device. In addition, the present invention provides overall more accurate and faster access times with better reliability.

DESCRIPTION OF THE PREFERRED EMBODIMENT

In the following detailed description of the preferred embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

The invention described in this application is useful with all mechanical configurations of disc drives having either rotary or linear actuation. In addition, the invention is also useful in all types of disc drives including hard disc drives, zip drives, floppy disc drives and any other type of drives where reducing vibration or resonance in a micro-actuator may be desirable.

Figure 1:
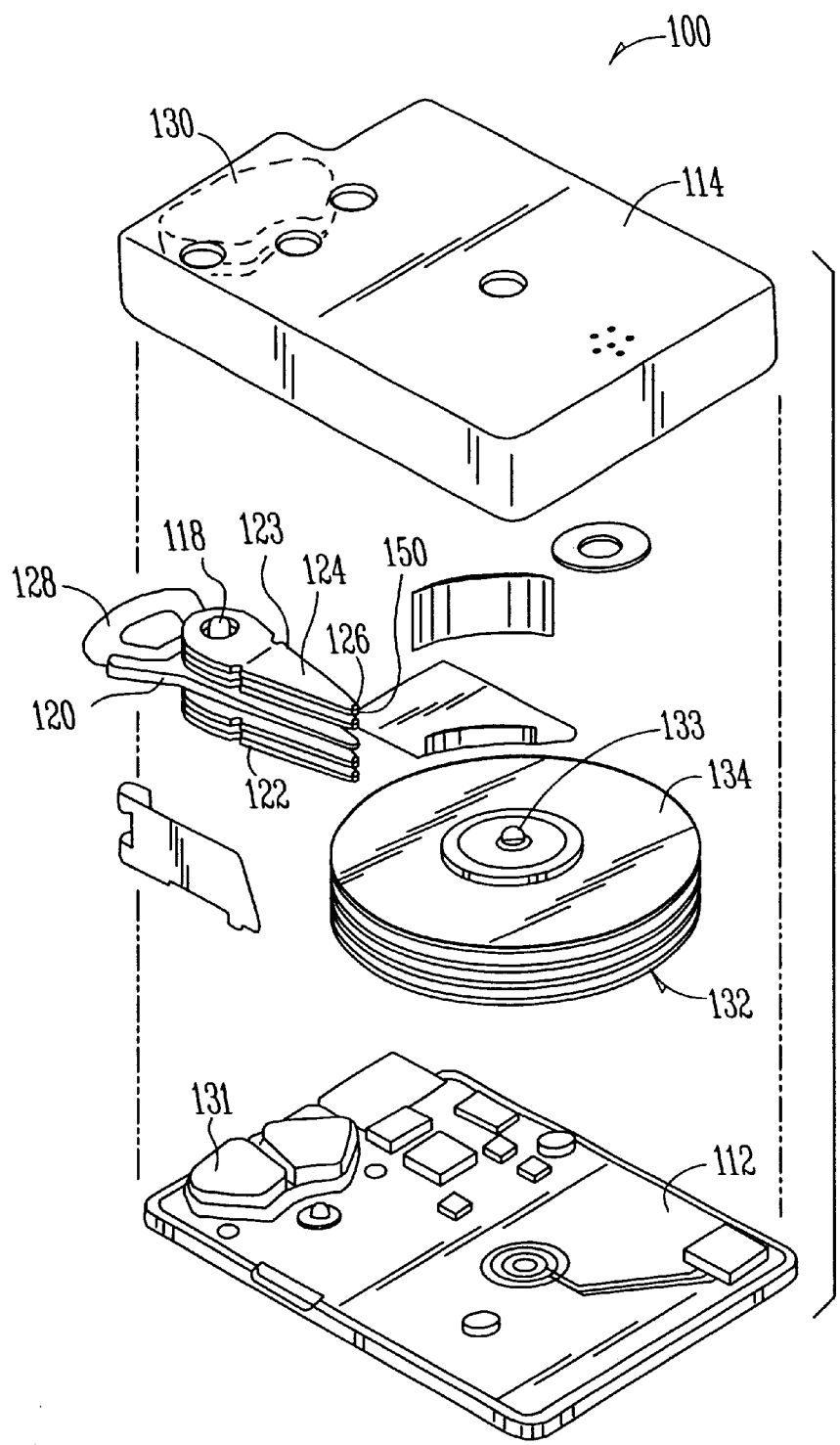
FIG. 1 is an exploded view of a disc drive with a multiple disc stack and a ramp assembly for loading and unloading transducers to and from the surfaces of the discs.

FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 that carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131 and the voice coil 128 are the key components of a voice coil motor that applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors that are within the hub 133 or under the hub.

Figure 2:
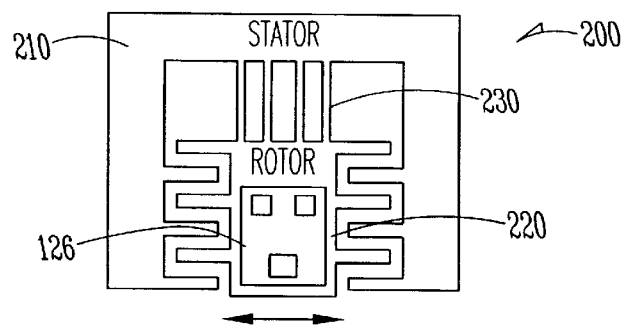
FIG. 2 is a magnified view of a micro-actuator.

As shown in FIG. 2, a magnified view of a micro-actuator is depicted. The micro-actuator 200 consists of a stationary part or stator portion 210 that is attached to the suspension (See FIG. 1), and a rotor portion 220 that carries the head 126. The stator portion 210 and rotor portion 220 are connected with springs or thin beams 230 that act as springs, allowing enough movement to center the head 126 on a very narrow track or switch between adjacent tracks.

Figure 3:
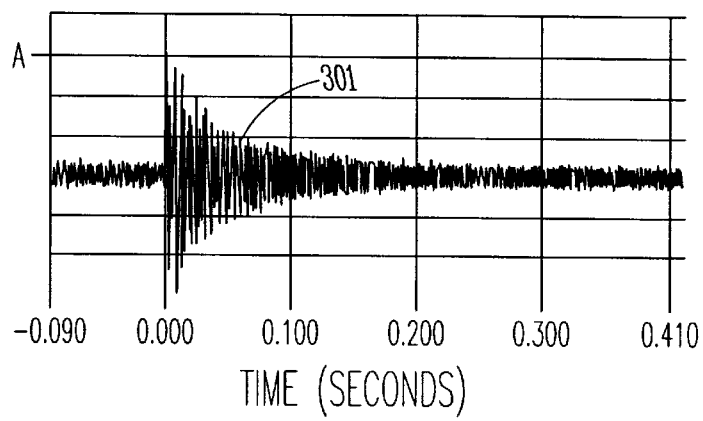
FIG. 3 is a graphical representation showing the amplitude of deflection or resonance of a micro-actuator in relation to time in response to an abrupt motion.

FIG. 3 is a graph with curve 301 showing amplitude versus time of the ringing or resonance of a micro-actuator in response to an abrupt motion, such as a step acceleration of magnitude A.

For a micro-actuator with natural frequency of F (in Hertz), the natural frequency time period is T=1/F. The micro-actuator is accelerated with a step acceleration of a(t)=0 for t<0 and a(t)=A for t>0, then resonance or ringing will occur as shown in FIG. 3.

Figure 4:
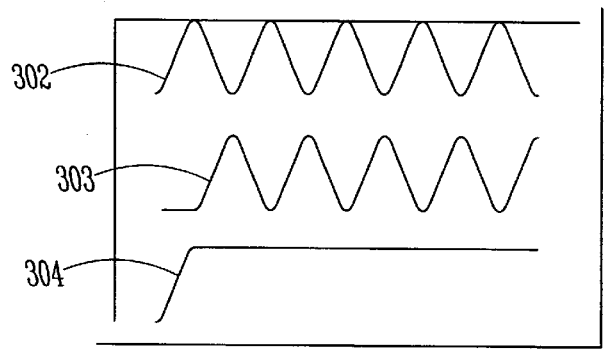
FIG. 4 is a graphical representation showing a first wave (a), a second wave (b) that is 180 degrees out of phase in relation to wave (a), and third wave (c) that is the sum of waves (a) and (b).

As shown in FIG. 4, the vibration indicated by wave (a) 302 may be cancelled out by adding wave (b) 303 to obtain wave (c) 304. Wave (b) 303 is another acceleration step of the same magnitude, but beginning one half period later. Wave (b) 303 is identical to wave (a) 302 except that it is 180 degrees out of phase. Wave (c) 304 is the resulting flat wave with no vibration resulting from the combination of wave (a) 302 and wave (b) 303.

In one embodiment of the present invention, the acceleration a(t) is modified by adding a step equal to half the final acceleration A. If a(t)=0 for t<0, a(t)=A/2 for 0<t<T/2, and a(t)=A for t>T/2, then the ringing will be prevented.

In a hard disc drive, voice coil actuator acceleration is usually a(t)=0 for t<0, A for 0<t<P/2, −A for P/2<t<P, and 0 for t>P where P is a sweep time period chosen so that the arm arrives at the track position desired. In this case, there are three acceleration steps 0 to A, A to −A, and −A to 0.

In one embodiment of the present invention a half step is added before each acceleration step as follows where P is the sweep time period, T is the natural frequency time period and A is the final acceleration: a(t)=0 for t<0, A/2 for 0<t<T/2, A for T/2<t<P/2, 0 for P/2<t<P/2+T/2 (this is a half step between A and −A), −A for P/2+T/2<t<P, −A/2 for P<t<P+T/2, and 0 for t>P+T/2.

The resonance or ringing excited at each step is eliminated, resulting in a sweep over the same distance as without the added half step, with the result of no ringing and an added movement time of T/2.

EXAMPLES

Numerical Simulation

The response of a head level micro-actuator to the main servo acceleration was modeled. Two cases are shown. The rotor mass is 2.4 mg and the micro-actuator spring constant is 94 N/m for a 1000 Hz primary resonance frequency.

Case A—Undamped Control

Figure 5:
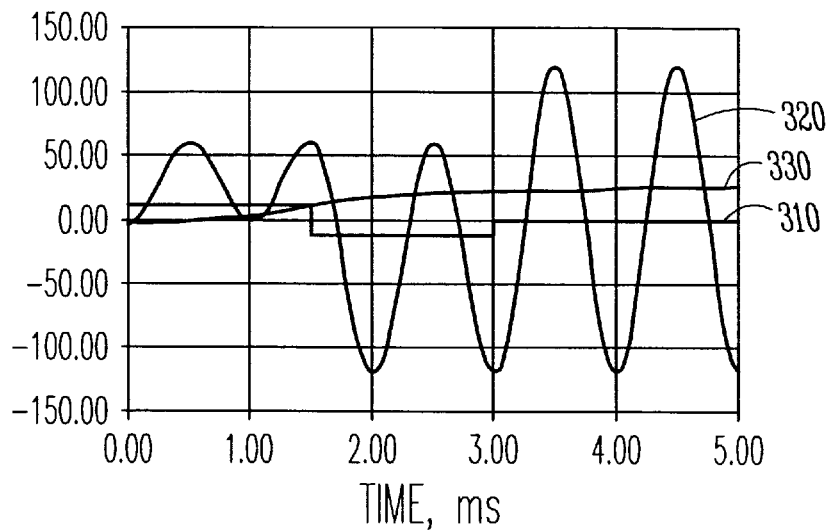
FIG. 5 is a graphical representation showing an undamped response of a micro-actuator head showing the acceleration of the voice coil at the slider, the rotor portion displacement with respect to the stator portion, and total head displacement with respect to the drive.

FIG. 5 shows the results of case A, of a MAGMA actuator in a worst case situation, without damping through stepped acceleration. The main servo (voice coil) acceleration at the slider is 120 g's for 1.5 ms, followed immediately by −120 g's for 1.5 ms to decelerate to a stop. Curve 310 is the voice coil acceleration at the slider in units of 100 m/s². Curve 320 is the rotor portion displacement with respect to the stator portion in units of microns. The ringing amplitude increased with each transition of the main servo acceleration, resulting in a ringing amplitude of 120 microns zero to peak. Curve 330 is the total head displacement with respect to the drive in units of 0.1 mm. The total head displacement with respect to the drive (total move distance) is 2.63 mm.

Case B—Modified Stepped Acceleration

Figure 6:
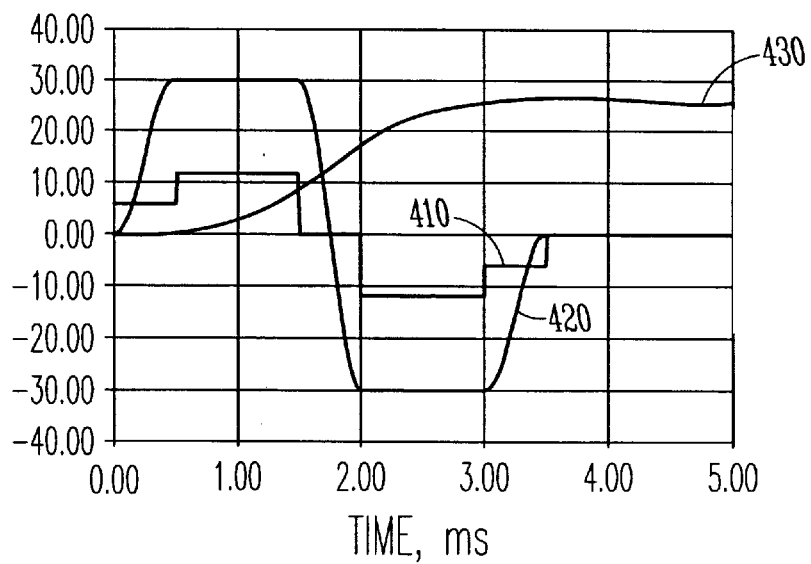
FIG. 6 is a graphical representation showing a damped response of a micro-actuator head showing the acceleration of the voice coil at the slider, the rotor portion displacement with respect to the stator portion, and total head displacement with respect to the drive.

FIG. 6 shows the results of case B, of the same MAGMA actuator with damping through stepped acceleration. The main servo acceleration profile was modified by adding steps of duration of ½ of the MAGMA primary resonance period (0.5 ms) and of an amplitude of ½ of the final acceleration. Curve 410 is the modified voice coil acceleration at the slider in units of 100 m/s². The stepped acceleration eliminates the ringing or resonance at a very modest cost of 0.5 ms of time added to the total move time, for the same 2.63 mm move. Curve 420 is the rotor portion displacement with respect to the stator portion in units of microns. The modified amplitude increased with each transition of the main servo acceleration, resulting in a modified amplitude of 30 microns zero to peak. Curve 430 is the total head displacement with respect to the drive in units of 0.1 mm. The total head displacement with respect to the drive (total move distance) is 2.63 mm.

EXPERIMENTAL EXAMPLES

Figure 7:
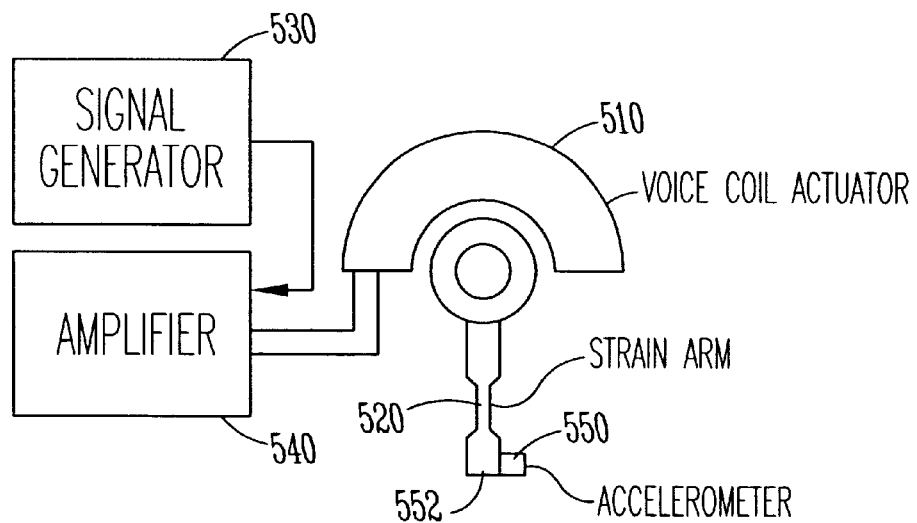
FIG. 7 is a schematic view of a voice coil actuator with an attached strain arm and accelerometer.

As shown in FIG. 7, A voice coil actuator 510 is fitted with a strain arm 520. An input waveform is created by a signal generator 530 and amplified by an amplifier 540. An accelerometer 550 on the end of the strain arm 520 is used to measure the acceleration of the strain arm tip 552.

Figure 8:
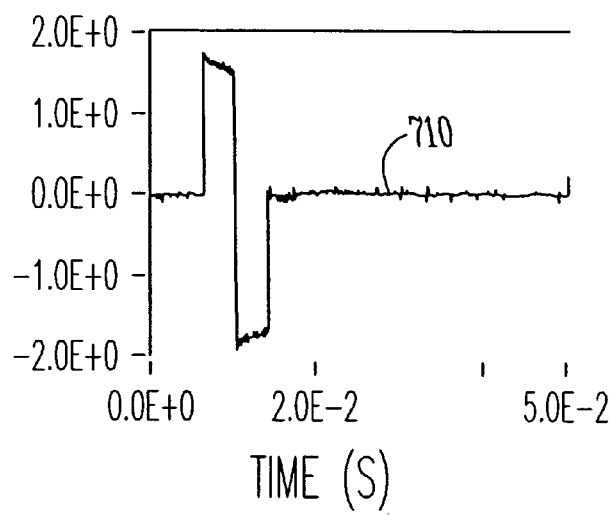
FIG. 8 is a graphical representation showing an input waveform to simulate an undamped sweep of a voice coil actuator.
Figure 9:
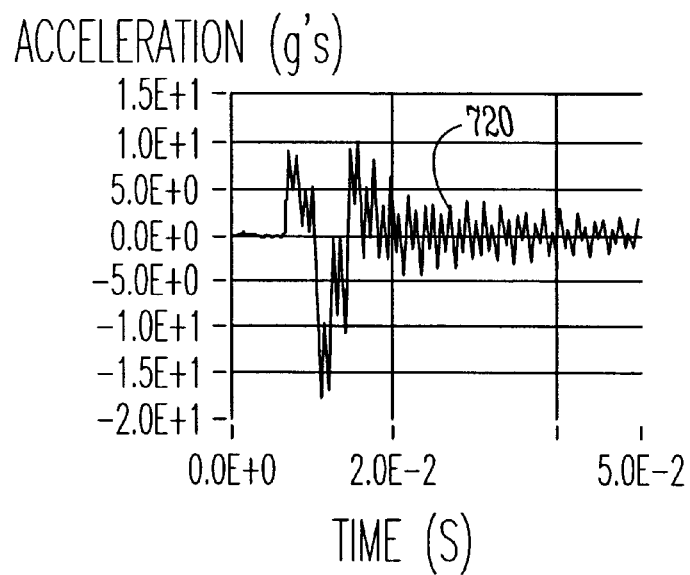
FIG. 9 is a graphical representation showing a resulting simulated acceleration of a micro-actuator head.
Figure 10:
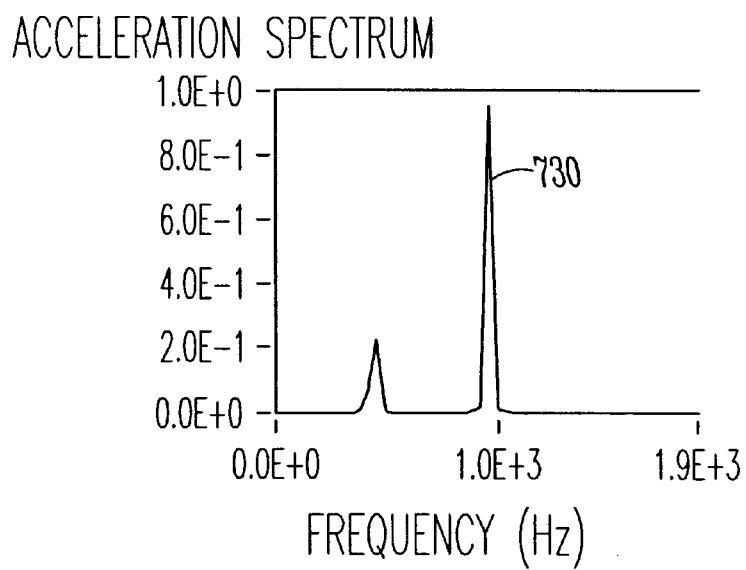
FIG. 10 is a graphical representation showing a resulting acceleration spectrum showing the strong modes at the natural frequencies.

FIGS. 8–10 show an undamped sweep. FIG. 8 shows curve 710, a waveform of drive voltage versus time, using a square wave pulse to simulate an undamped sweep. FIG. 9 shows curve 720, the resulting acceleration versus time. FIG. 10 shows curve 730, an acceleration spectrum indicating the natural vibration modes of the voice coil actuator 510 and strain arm 520. Curve 730 of FIG. 10 indicates strong modes at the natural frequencies of the voice coil actuator 510 and strain arm 520 at 430 and 960 Hz.

Figure 11:
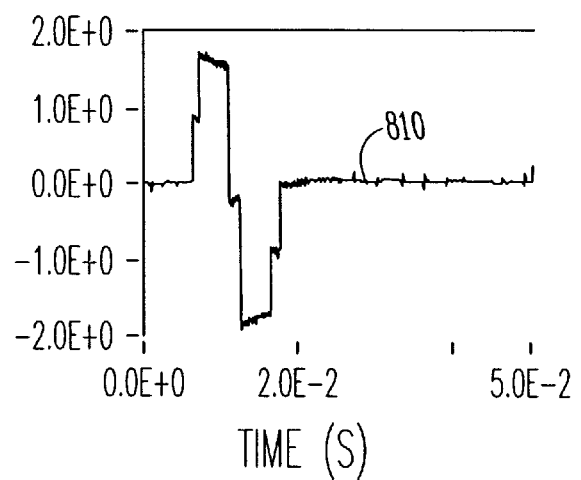
FIGS. 11–13 are graphical representations similar to FIGS. 8–10 except the input wave form includes a 50% step to diminish a natural frequency mode.
Figure 12:
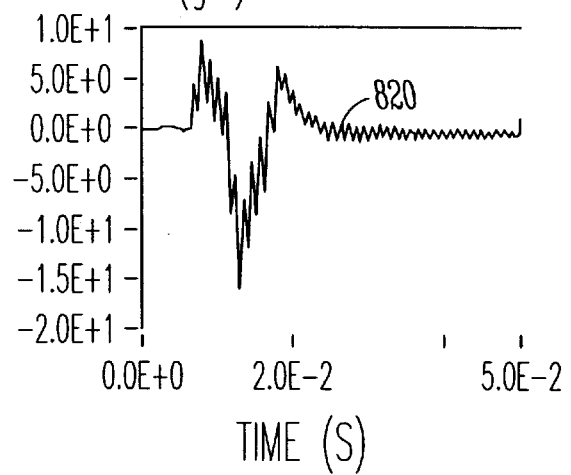
Figure 13:
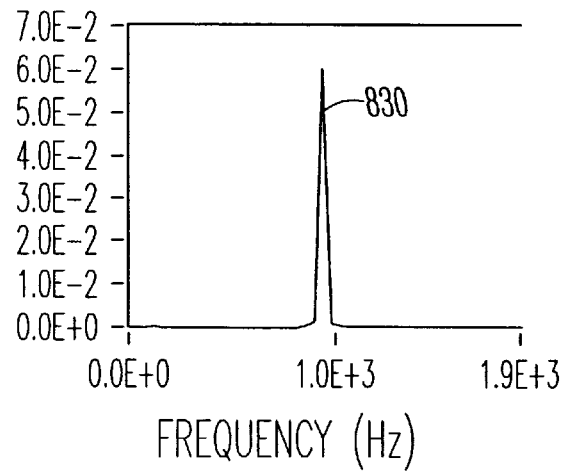

FIGS. 11–13 show a partially damped sweep including 50% steps to diminish the 430 Hz mode. FIG. 11 shows curve 810, a waveform of drive voltage versus time, using a square wave pulse to simulate a damped sweep including 50% steps to diminish the 430 Hz mode. FIG. 12 shows curve 820, the resulting acceleration versus time. FIG. 13 shows curve 830, an acceleration spectrum indicating an attenuated response at the natural vibration modes. Note that the scale is different compared to FIG. 10 and that the 430 Hz node is attenuated by 77 dB (which in this case is below the noise floor of the experimental equipment) and the 960 Hz mode is attenuated by 24 dB.

Figure 14:
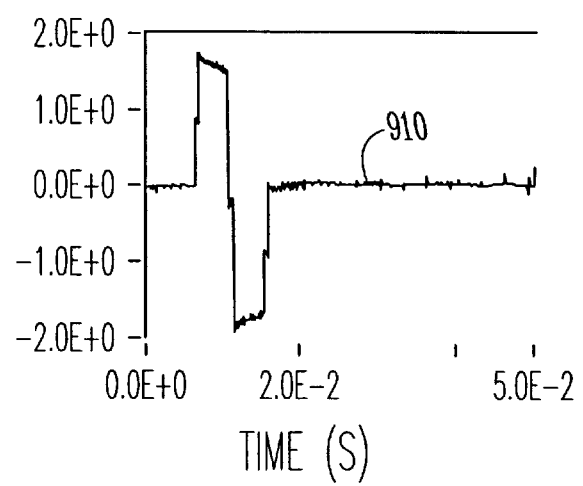
FIGS. 14–16 are graphical representations similar to FIGS. 11–13 except the input wave form includes a 50% step to diminish another natural frequency mode.
Figure 15:
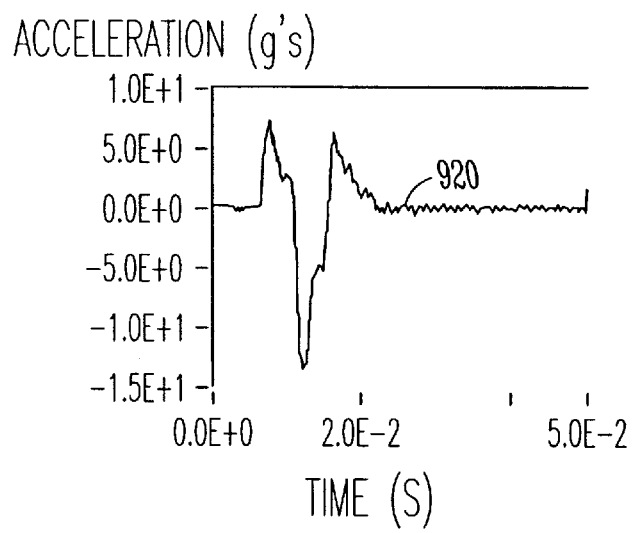
Figure 16:
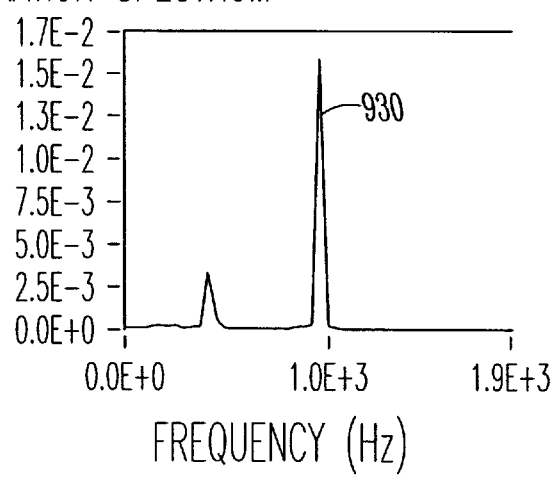

FIGS. 14–16 show a damped sweep including 50% steps to diminish the 960 Hz mode. FIG. 14 shows curve 910, a waveform of drive voltage versus time, using a square wave pulse to simulate a damped sweep including 50% steps to diminish the 960 Hz mode. FIG. 15 shows curve 920, the resulting acceleration versus time. FIG. 16 shows curve 930, an acceleration spectrum indicating an attenuated response at the natural vibration modes. Note that the scale for FIG. 16 is different compared to FIGS. 10 and 13. The 430 Hz node is attenuated by 37 dB and the 960 Hz mode is attenuated by 36 dB.

Figure 17:
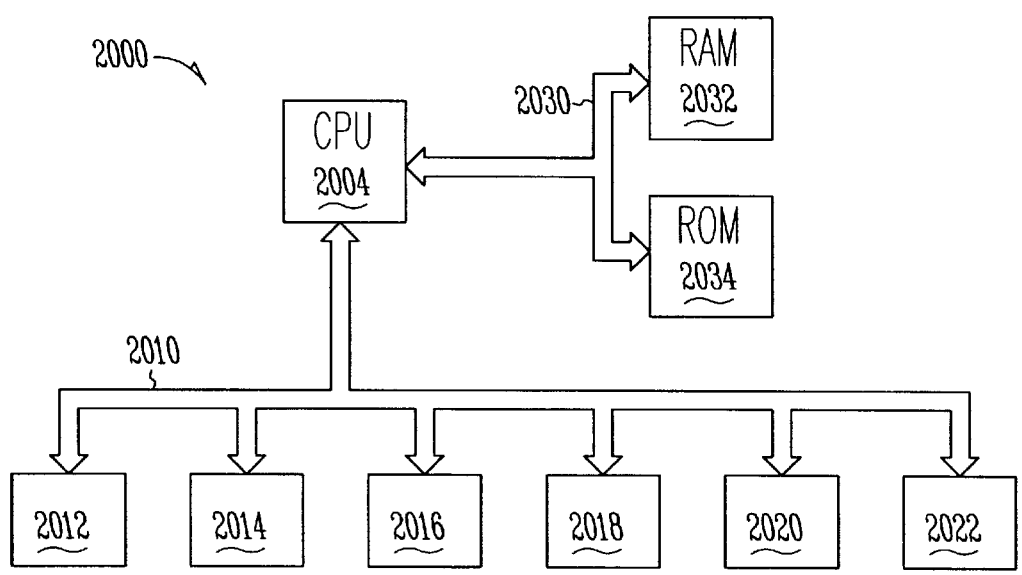
FIG. 17 is a schematic view of a computer system.

FIG. 17 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device that includes the stepped disc drive voice coil actuator acceleration described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for reducing micro-actuator resonance as described above.

In conclusion, the present invention provides stepped disc drive voice coil actuator acceleration for reducing ringing or resonance of head level micro-actuators for a mass storage device.

One embodiment includes a disc drive 100 having a voice coil actuator 120 with an attached suspension 124 and head 126, the head 126 including a micro-actuator 200. The micro-actuator 200 having at least one natural frequency and at least one natural frequency time period. The voice coil actuator 120 is adapted to attenuate a resonance of the micro-actuator 200 at the at least one natural frequency using a stepped acceleration.

One embodiment includes a disc drive 100 including a suspension 124 attached to a voice coil actuator 120 with a head 126 attached to the suspension 124. The head 126 includes a micro-actuator 200 having a rotor portion 220 and a stator portion 210 with the stator portion 210 attached to the suspension 124. The rotor portion 220 is attached to the stator portion 210 with the rotor portion 220 having a resonance at a natural frequency with respect to the stator portion 210 and having a natural frequency time period. The voice coil actuator 120 is adapted to sweep the head 126 into position by accelerating and decelerating the head 126 in at least three steps.

One embodiment includes a method for damping a micro-actuator 200 including providing a disc drive 100 with a voice coil actuator 120 and a micro-actuator 200, the micro-actuator 200 having a natural frequency and a natural frequency time period, and applying a stepped acceleration to the micro-actuator 200 with the voice coil actuator 120.

One embodiment includes an information system 2000 including a disc drive 100 having a stepped disc drive voice coil actuator acceleration for reducing ringing of head level micro-actuators 200 for a mass storage device 100, 2012.

The present invention provides stepped disc drive voice coil actuator acceleration for reducing ringing or resonance of head level micro-actuators 200 for a mass storage device 100, 2012. In addition, the present invention provides overall more accurate and faster access times with better reliability.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An apparatus comprising:
   a suspension attached to a voice coil actuator;
   a head attached to the suspension, the head including a micro-actuator;
   the micro-actuator having at least one natural frequency and at least one natural frequency time period; and
   the voice coil actuator adapted to attenuate a resonance of the micro-actuator at the at least one natural frequency using a stepped acceleration.

2. The appartus of claim 1 wherein the stepped acceleration includes an acceleration step equal to one half of a final acceleration.

3. The appartus of claim 2 wherein the acceleration step is for a duration equal to one half the natural frequency time period.

4. The appartus of claim 1 wherein the stepped acceleration includes and intermediate acceleration step.

5. The apparatus of claim 1 wherein the stepped acceleration includes an acceleration step having an acceleration equal to one half of a final acceleration for a duration equal to one half the natural frequency time period.

6. The apparatus of claim 1 wherein the micro-actuator is sweepable from a first location to a second location, the period of time to sweep the micro-actuator having a duration of a sweep time period plus one half of the natural frequency time period.

7. The appartus of claim 6 wherein the stepped acceleration includes
   a first acceleration step equal to one half the final acceleration for a duration equal to one half the natural frequency time period,
   a second acceleration step of the final acceleration for a duration equal to one half of the sweep time period minus one half the natural frequency time period,
   a first step of zero acceleration for a duration of one half the natural frequency time period,
   a first step of deceleration equal to one half the final deceleration for a duration equal to one half of the sweep time period minus one half the natural frequency time period, and
   a second step of deceleration equal to one half the final deceleration for a duration of one half the natural frequency time period.

8. An apparatus comprising:
   a suspension attached to a voice coil actuator;
   a head attached to the suspension, the head including a micro-actuator, the micro-actuator including a rotor portion and a stator portion, the stator portion attached to the suspension;
   the rotor portion attached to the stator portion, the rotor portion having a resonance at a natural frequency with respect to the stator portion and having a natural frequency time period;
   the voice coil actuator adapted to sweep the head into position by accelerating and deceleration the head in at least three steps, wherein the at least three steps includes an intermediate step.

9. The apparatus of claim 8 wherein one of the at least three steps includes and acceleration step equal to one half of a final acceleration.

10. The apparatus of claim 9 wherein the acceleration step is for a duration equal to one half the natural frequency time period.

11. The apparatus of claim 8 wherein one of the at least three steps includes an acceleration equal to one half of a final acceleration for a duration equal to one half the natural frequency time period.

12. The apparatus of claim 8 wherein the micro-actuator is sweepable from a first location to a second location, the period of time to sweep the micro-actuator having a duration of a sweep time period plus one half of the natural frequency time period of the rotor portion of the micro-actuator.

13. The appartus of claim 12 wherein the at least three steps includes
   a first acceleration step equal to one half the final acceleration for a duration equal to one half the natural frequency time period,
   a second acceleration step of the final acceleration for a duration equal to one half of the sweep time period minus one half the natural frequency time period,
   a first step of deceleration equal to the final deceleration for a duration equal to one half of the sweep time period minus one half the natural frequency time period, and
   a second step of deceleration equal to one half the final deceleration for a duration of one half the natural frequency time period.

14. A method for damping a micro-actuator comprising the steps of:
   (a) providing a disc drive with a voice coil actuator and a micro-actuator, the micro-actuator having a natural frequency and a natural frequency time period;
   (b) applying a stepped acceleration to the micro-actuator with the voice coil actuator; and
      (b)(i) an intermediate acceleration step.

15. The method of claim 14 wherein the applying step (b) includes (b)(i) having an acceleration equal to one half of a final acceleration.

16. The method of claim 15 wherein the acceleration step (b)(i) is for a duration equal to one half the natural frequency time period.

17. The method of claim 14 further comprising the step of (c) sweeping the micro-actuator from a first location to a second location, the sweeping step (c) having a duration of a sweep time period plus one half of the natural frequency time period.

18. The method of claim 17 wherein the applying step (b) further includes
- (b)(i) providing a first acceleration step equal to one half the final acceleration for a duration equal to one half the natural frequency time period;
- (b)(iii) providing a first step of zero acceleration a duration of one half the natural frequency time period;
- (b)(iv) providing a first step of deceleration equal to the final deceleration for a duration equal to one half of the time period minus one half the natural frequency time period; and
- (b)(v) providing a second step of deceleration equal to one half the final deceleration for a duration of one half the natural frequency time period.

19. An device for damping a micro-actuator comprising:

an voice coil actuator attached to a micro-actuator by a suspension; and means for damping the resonance of the micro-actuator by the voice coil actuator.

* * * * *